(12) United States Patent
Wang

(10) Patent No.: US 10,446,048 B2
(45) Date of Patent: Oct. 15, 2019

(54) LEARNING ASSISTANT SYSTEM CAPABLE OF INDICATING PIANO FINGERING

(71) Applicant: PEGATRON CORPORATION, Taipei (TW)

(72) Inventor: Jing-Rung Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/233,105

(22) Filed: Dec. 27, 2018

(65) Prior Publication Data

US 2019/0213904 A1 Jul. 11, 2019

(30) Foreign Application Priority Data

Jan. 11, 2018 (TW) .............................. 107101066 A

(51) Int. Cl.
*G09B 15/00* (2006.01)
*G06F 3/01* (2006.01)
*G06F 3/14* (2006.01)

(52) U.S. Cl.
CPC ............ *G09B 15/003* (2013.01); *G06F 3/016* (2013.01); *G06F 3/14* (2013.01); *G06F 2203/0331* (2013.01)

(58) Field of Classification Search
CPC ........ G09B 15/003; G06F 3/016; G06F 3/014
See application file for complete search history.

(56) References Cited

U.S. PATENT DOCUMENTS

| 5,184,319 A | * | 2/1993 | Kramer | G06F 3/011 345/156 |
| 5,392,682 A | * | 2/1995 | McCartney-Hoy | G09B 15/003 84/470 R |
| 5,581,484 A | * | 12/1996 | Prince | G06F 3/014 340/407.1 |
| 5,631,861 A | * | 5/1997 | Kramer | G06F 3/011 414/5 |
| 6,042,555 A | * | 3/2000 | Kramer | A61B 5/225 600/595 |

(Continued)

FOREIGN PATENT DOCUMENTS

| TW | 200817988 A | 4/2008 |
| TW | 201232330 A1 | 8/2012 |
| TW | 201633073 A | 9/2016 |

*Primary Examiner* — Robert W Horn
(74) *Attorney, Agent, or Firm* — Winston Hsu

(57) ABSTRACT

A learning assistant system includes a memory, a controller, an assistant interface, and a wearable device. The memory stores a musical composition information including information of a plurality music notes. The controller outputs a plurality of first electronic signals and a plurality of second electronic signals in series according to the information of the plurality of musical notes. In correspondence with each musical note of the plurality of music notes, the controller outputs a first electronic signal and a second electronic signal at the same time. The assistant interface covers a physical keyboard, and displays a key indication image on a corresponding key of the physical keyboard according to each first electronic signal of the plurality of first electronic signals. The wearable device includes a plurality of finger sleeves, generates an indication signal on a corresponding finger sleeve according to each second electronic signal.

16 Claims, 3 Drawing Sheets

(56) References Cited

U.S. PATENT DOCUMENTS

| | | | | |
|---|---|---|---|---|
| 6,059,506 A * | 5/2000 | Kramer | ............ | G06F 3/011 |
| | | | | 414/5 |
| 6,304,840 B1 * | 10/2001 | Vance | ............ | G06F 3/014 |
| | | | | 703/21 |
| 7,161,579 B2 * | 1/2007 | Daniel | ............ | A63F 13/06 |
| | | | | 345/156 |
| 7,366,990 B2 | 4/2008 | Pitroda | | |
| 9,104,271 B1 * | 8/2015 | Adams | ............ | G06F 3/0426 |
| 9,208,763 B2 * | 12/2015 | Avitabile | ............ | G09B 15/003 |
| 9,836,131 B2 * | 12/2017 | Skogsrud | ............ | G06F 3/014 |
| 9,947,238 B2 * | 4/2018 | Tolan | ............ | G09B 15/023 |
| 10,037,088 B2 * | 7/2018 | Skogsrud | ............ | A63F 13/814 |
| 2008/0163130 A1 | 7/2008 | Westerman | | |
| 2012/0209560 A1 * | 8/2012 | Young | ............ | G06F 3/014 |
| | | | | 702/141 |
| 2013/0068086 A1 * | 3/2013 | Mittelstadt | ............ | G09B 15/003 |
| | | | | 84/645 |
| 2013/0204435 A1 * | 8/2013 | Moon | ............ | G09B 19/00 |
| | | | | 700/258 |
| 2015/0035743 A1 * | 2/2015 | Rosener | ............ | G06F 3/014 |
| | | | | 345/156 |
| 2015/0317910 A1 * | 11/2015 | Daniels | ............ | G16H 20/30 |
| | | | | 84/485 R |
| 2015/0332601 A1 * | 11/2015 | Tamari | ............ | G09B 15/06 |
| | | | | 84/485 R |
| 2017/0215495 A1 * | 8/2017 | Okumiya | ............ | A41D 19/0013 |
| 2018/0336871 A1 * | 11/2018 | Hamalainen | ............ | G06F 3/0346 |
| 2019/0213904 A1 * | 7/2019 | Wang | ............ | G09B 15/003 |

\* cited by examiner

LEARNING ASSISTANT SYSTEM CAPABLE OF INDICATING PIANO FINGERING

CROSS REFERENCE TO RELATED APPLICATION

This application claims priority of Taiwan application No. 107101066, which was filed on Jan. 11, 2018, and is included herein by reference.

BACKGROUND

1. Technology Field

The present invention is related to a learning assistant system, and more particularly, to a learning assistant system capable of indicating piano fingering.

2. Description of the Prior Art

Although music is often said to be a common language for human beings, playing a musical instrument can be difficult for many players. In order to be skillful, a player needs to rely on the guidance of mentors. However, many people have a very busy schedule, it is not easy to arrange a time to learn to play an instrument with an instructor. In addition, before learning to play the instrument, people must first learn to read the sheet music, understand the symbols in the sheet music, and then use the corresponding rhythm and intensity to play the instrument. The learning process is tough for a beginner. Especially for adults, in order to play a phrase correctly, it often takes time to practice. Many people then give up learning to play an instrument because they gradually lose their interest and sense of accomplishment during their learning process.

In the prior art, although there are applications for assisting the learning process, these applications are mostly applied to a tablet or a mobile phone with a touch panel, they fail to simulate the learning on a real piano. Therefore, the learners cannot experience the fun of playing piano and cannot learn to play piano with correct piano fingering.

SUMMARY

One embodiment of the present invention discloses a learning assistant system. The learning assistant system includes a memory, controller, an assistant interface, and a wearable device.

The memory stores the musical composition information including a plurality of musical notes arranged in sequence, and each musical note indicates a pitch and a duration of a sound. The controller outputs a plurality of first electronic signals and a plurality of second electronic signals in sequence according to the plurality of musical notes. In correspondence to each musical note, one of the first electronic signals and one of the second electronic signals are outputted at a same time.

The assistant interface is disposed on a physical keyboard, and displays a key indication image on a key of the physical keyboard according to each first electronic signal. The wearable device includes a plurality of finger sleeves, and generates an indication signal on one of the finger sleeves according to each second electronic signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
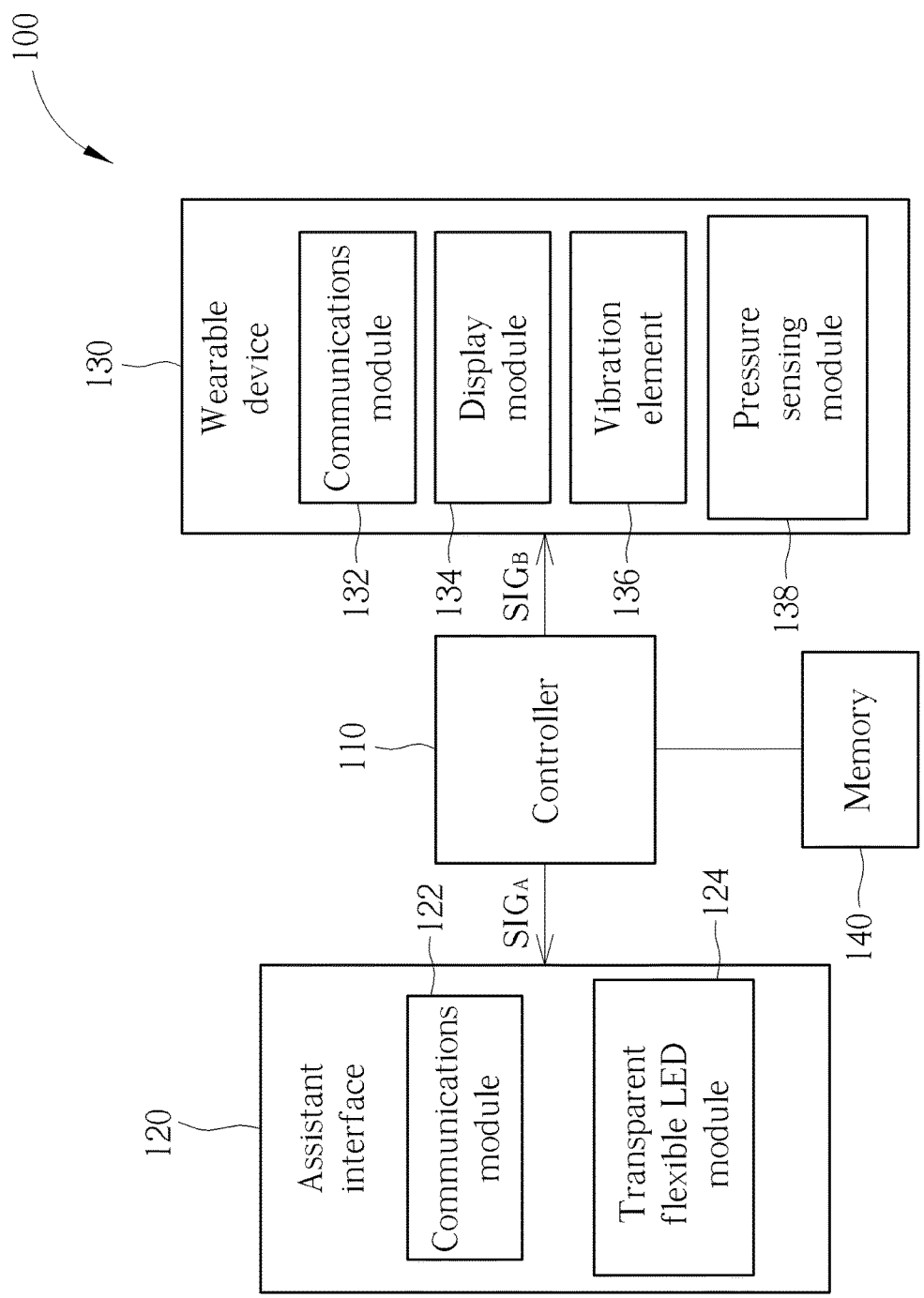
FIG. 1 shows a learning assistant system according to one embodiment of the present invention.
Figure 2:
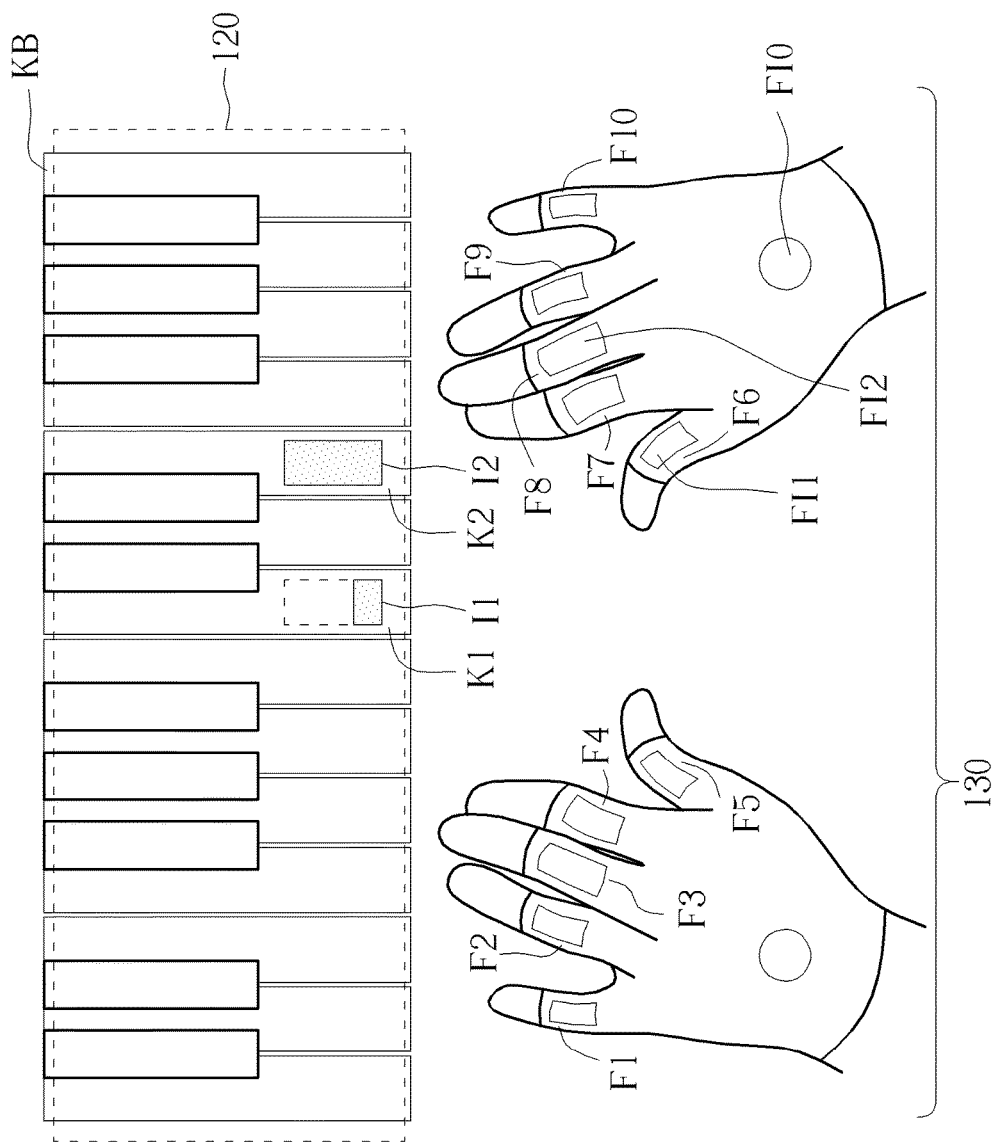
FIG. 2 shows a scenario of the learning assistant system in FIG. 1 in use according to one embodiment of the present invention.

FIG. 1 shows a learning assistant system 100 according to one embodiment of the present invention. FIG. 2 shows a scenario of the learning assistant system 100 in use according to one embodiment of the present invention. The learning assistant system 100 includes a controller 110, an assistant interface 120, a wearable device 130, and a memory 140.

In FIG. 2, the learning assistant system 100 can be used to assist a user to learn playing piano, and the assistant interface 120 can be disposed on a physical keyboard KB of a piano. The assistant interface 120 can display a key indication image on a key of the physical keyboard KB according to the electronic signals transmitted from the controller 110 for prompting the user to press the correct key.

In addition, in some embodiments of the present invention, the wearable device 130 can be designed as gloves for the user to wear. For example, in FIG. 2, the wearable device 130 can have a plurality of finger sleeves F1 to F10. The wearable device 130 can generate an indication signal on one of the finger sleeves F1 to F10 according to the electronic signals transmitted from the controller 110. Consequently, the user can be prompted to press the key on which the key indication image is displayed with the corresponding finger. For example, in FIG. 2, since the assistant interface 120 displays the key indication image I1 on the physical key K1 and the wearable device 130 generates the indication signal on the finger sleeve F6, the user would get the hint and press the physical key K1 on which the key indication image I1 is displayed with her/his right thumb wearing the finger sleeve F6.

In FIG. 1, the controller 110 can output the corresponding electronic signals according to the musical composition information to inform the user how to play the piano. The musical composition information includes a plurality of musical notes arranged in sequence, each musical note indicating a pitch and a duration of a sound, for example, represented by a quarter note or an eighth note. In addition, in some embodiments, the musical composition information can further include a plurality of bars in the sheet music, each bar includes the beat information. For example, in front of the bars, there are time signatures such as 2/4 and 3/4, in which the numerator represents how many beats are in each bar, and the denominator represents what notes are used to represent a beat. For example, 2/4 means that a quarter note is used as one beat, and there are two beats in a bar. The beat information of each bar can form a rhythm with a certain speed, and the rhythm combining information of musical notes (with their pitches, the sequence orders, and the durations of sound) can form a melody. That is, with the musical composition information, the embodiments of the present invention would be able to assist the user to play melodies with corresponding rhythms.

The controller 110 can output a plurality of first electronic signals in sequence to the assistant interface 120 according to the plurality of musical notes recorded in the musical composition information. The assistant interface 120 can receive the first electronic signals, and the assistant interface 120 can display a key indication image on a key of the physical keyboard according to each of the first electronic signals. In some embodiments, the assistant interface 120 can include a transparent flexible light emitting diode (LED) module 124 for covering on the physical keyboard KB, and the transparent flexible LED module 124 can display the key indication images on the physical keys without blocking the sight of the physical keys.

Meanwhile, the controller 110 can further output a plurality of second electronic signals in sequence according to the plurality of musical notes recorded in the musical composition information. The communications module 132 of the wearable device 130 can receive the second electronic signals so the wearable device 130 can generate an indication signals on the corresponding finger sleeve according each of the second electronic signals. In some embodiments, the controller 110 can output a first electronic signal, for example, $SIG_A$, to the assistant interface 120, and output a second electronic signal, for example, $SIG_B$, to the wearable device 130 at the same time in correspondence to each musical note. Since the first electronic signal $SIG_A$ and the second electronic signal $SIG_B$ outputted at the same time are corresponding to the same musical note in the musical composition information, the user can intuitively depress the correct key with the correct finger to play the tone that should be played in the current musical composition information with the cooperation of the assistant interface 120 and the wearable device 130. Since the learning assistant system 100 can prompt the user instantly and intuitively, the learning assistant system 100 can not only help the user to learn, but also allow the user to enjoy and have a sense of accomplishment in playing piano in a short time, thereby being motivated to learn to play piano.

For example, the first electronic signal $SIG_A$ and the second electronic signal $SIG_B$ can be corresponding to C4 of the scientific tone notation. Therefore, in FIG. 2, the assistant interface 120 can display the key indication image I1 on the corresponding physical key K1 on the physical keyboard KB. In some embodiments, to allow the user to be aware of the duration of the sound intuitively, the learning assistant system 100 can indicate the information with the size of the key indication image I1. That is, the size of the key indication image I1 can be positively correlated to the duration of the corresponding musical note. The greater the image size, the longer the duration of the musical note should last. The other way around, the smaller the image size, the shorter the duration of the musical note should last. For example, in FIG. 2, since the key indication image I1 on the physical key K1 has a length shorter than a length of the key indication image I2 on the physical key K2, the musical note corresponding to the physical key K2 should continue for a longer duration. Consequently, the user can be aware of the information instantly and control the speed and intensity of playing accordingly.

In addition, the wearable device 130 can include a display module 134, and the display module 134 can include the display units disposed in the finger sleeves F1 to F10. Therefore, in FIG. 2, the wearable device 130 can generate the finger indication image FI1 on the finger sleeve F6 as an indication signal, and the color of the finger indication image FI1 can be the same as the color of the key indication image I1. Consequently, the user would know to press the physical key K1 with the thumb wearing the finger sleeve F6. In some embodiments, the display units of the module 134 can be implemented by flexible display panels, so that the user won't be hindered when pressing the keys.

When different keys should be depressed at the same time, the learning assistant system 100 can display the key indication images with different colors on different keys, and display the finger indication images with the corresponding colors on the corresponding finger sleeves of the wearable device 130. Consequently, the user can use the correct fingers to press the corresponding keys according to the matched colors. For example, in FIG. 2, the key indication image I1 and the finger indication image FI1 can both be blue, and the key indication image I2 and the finger indication image FI2 can both be red. In this case, the user would be prompted to use the right thumb wearing the finger sleeve F6 to press the physical key K1, and use the right middle finger wearing the finger sleeve F8 to press the physical key K2.

In the embodiment shown in FIG. 1, the wearable device 130 can further include a vibration element 136. In this case, when the wearable device 160 displays the finger indication image FI1 on the finger sleeve F6, the vibration element 136 can generate vibration on the finger sleeve F6 according to the second electronic signal $SIG_B$ at the same time, allowing the user to have an even more instant response.

In FIG. 1, the wearable device 130 can further include a pressure sensing module 138, and the pressure sensing module 138 can generate a sensing signal according to a pressing event on the physical keyboard KB. For example, the pressure sensing module 138 can be a piezoelectric module disposed at the joints of fingers. Therefore, when the user moves the joint to press the keyboard, the pressure sensing module 138 can detect the pressing event. Consequently, the controller 110 can further determine how accurately the sensing signal matches with a corresponding musical note, for example, whether the pressing timing is correct, the pressing duration is correct, and the pressing intensity is desirable.

According to how accurately the sensing signal matches with a corresponding musical note, the controller 110 can issue a rating to the user as a feedback. In FIG. 2, to give the user an instant feedback, the display module 134 of the wearable device 130 can display the rating image FI0 at the back of the palm to show the ratings with corresponding colors or shapes.

In some embodiments, the controller 110, the assistant interface 120, and the wearable device 130 can be linked wirelessly. For example, the Bluetooth communications can be used to transmit and receive signals. Consequently, the user can set up the controller 110, the assistant interface 120 and the wearable device 130 freely without being obstructed by the transmission line when playing piano. However, the present invention is not limited to using wireless communications. In some other embodiments, the learning assistant system 100 can also transmit signals among the controller 110, the assistant interface 120, and the wearable device 130 with wired communications. Also, in some embodiments, some of the devices may communicate with wired communications, and some of the devices may communicate with wireless communications. For example, since the controller 110 and the assistant interface 120 mostly stay unmoved during the operation, the signal transmission between controller 110 and the assistant interface 120 may be performed with wired communications. However, since the wearable device 130 may be moved with the user during the operation, the signal transmission between the controller 110 and the wearable device 130 can be performed with wireless communications.

In addition, in some embodiments, the memory 140 can store the information of a plurality of musical compositions in advance, and the musical composition information can include the information of a plurality of musical notes, such as the pitch and the finger placement corresponding to the musical note. Therefore, when the user chooses a desired musical composition, the controller 110 can retrieve the corresponding musical composition information from the memory 140, and can sequentially output the plurality of first electronic signals and the plurality of second electronic signals to the assistant interface 120 and the wearable device 130 according to the musical notes recorded in the musical composition information. In addition, the controller 110 can provide the selection interface through an external screen so the user can select the desired track, and the controller 110 can also speed up or slow down the speed of the electronic signals according to the user's choice to match the user's learning pace.

In addition, the controller 110 can not only store the musical composition information, but can also scan the sheet music with an image capturing device, and convert the musical notes into the corresponding content of the musical composition information according to the result of image recognition. Generally, although the sheet music does not record the piano fingering, the musical notes and the piano fingering usually have a fixed correspondence. Therefore, the controller 110 can assign finger placements to the corresponding musical notes according to a predetermined algorithm so as to generate the second electronic signals. However, the present invention is not limited to assigning the finger placements by the controller 110. In some other embodiments, the controller 110 can also accept the piano fingering information from the user through the selection interface, and can even record the piano fingering of the corresponding note with the pressure sensing module 138 of the wearing device 130 when the user is playing the piano, and the recorded piano fingering can be composed to the musical composition information.

Figure 3:
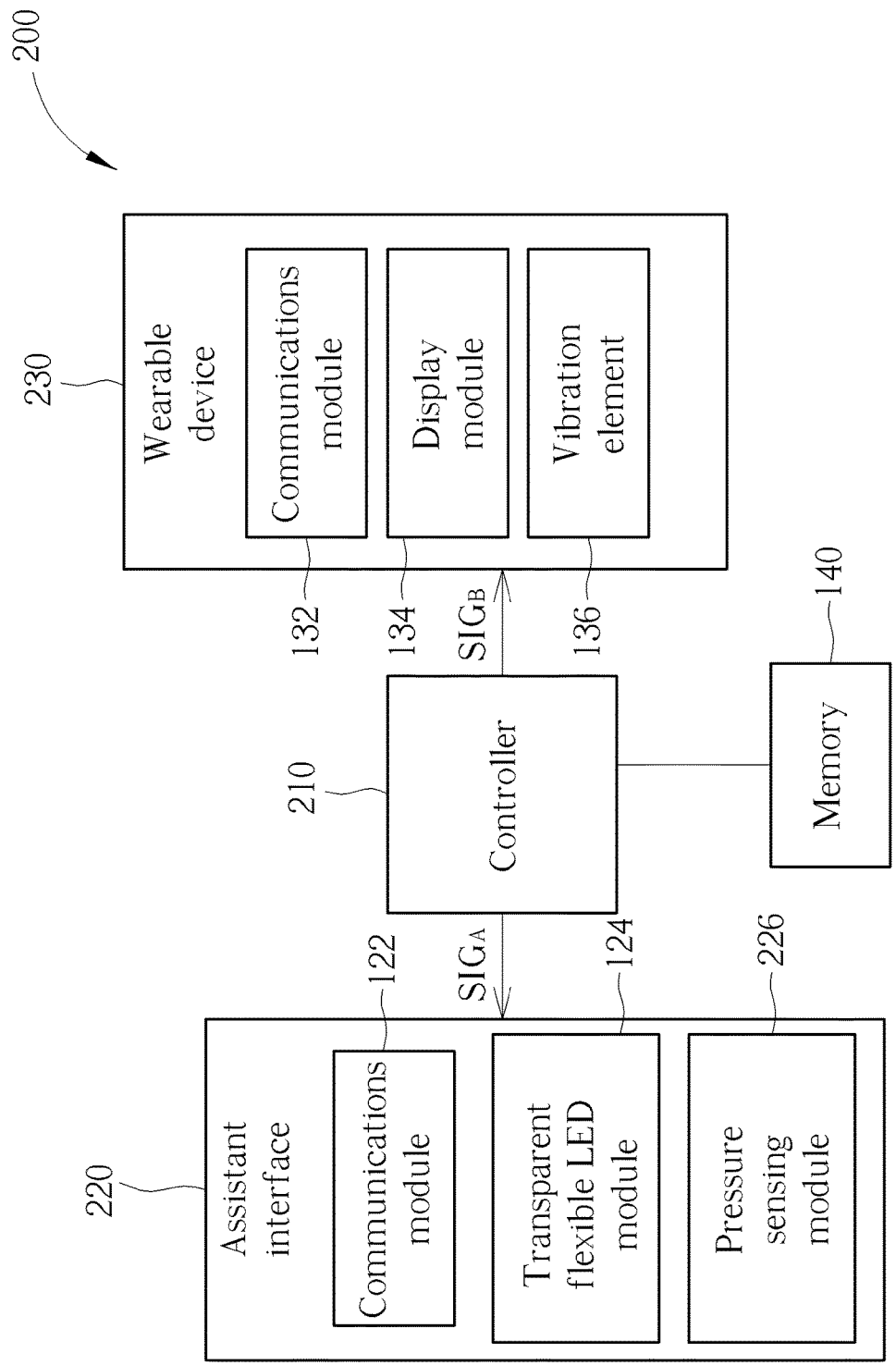
FIG. 3 shows a learning assistant system according to another embodiment of the present invention.

Although in FIG. 1, the pressure sensing module 138 is disposed in the wearable device 130, the present invention is not limited to having the pressure sensing module in the wearable device 130. In some other embodiments, the pressure sensing module can be disposed in the assistant interface. FIG. 3 shows a learning assistant system 200 according to another embodiment of the present invention.

The learning assistant system 200 and the learning assistant system 100 have similar structures and can be operated with similar principles. The difference between these two is in that the wearable device 230 of the learning assistant system 200 may not include the pressure sensing module while the assistant interface 220 can include the pressure sensing module 226. The pressure sensing module 226 can generate a sensing signal according to the pressing event on the physical keyboard KB, and the controller 210 can issue a rating to the user as a feedback according to how accurately the sensing signal matches with a corresponding musical note.

In some embodiments, the pressure sensing module 226 can, for example, be a touch sensor, such as a capacitive, resistive or sonic touch sensor. Also, the touch sensor can be implemented by an image sensor. In this case, the image sensor can detect if the user's finger touches the physical keyboard and generate the sensing signal accordingly.

In summary, the learning assistant system provided by the embodiments of the present invention can be installed without purchasing a new instrument. Also, with the assistant interface and the wearable device, the user can receive the instant and intuitive key indication image and feedback, speeding up the user's learning process, gaining a sense of accomplishment, and improving the motivation of learning to play piano.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A learning assistant system comprising:
a memory configured to store musical composition information comprising a plurality of musical notes arranged in sequence, each musical note indicating a pitch and a duration of a sound;
a controller configured to output a plurality of first electronic signals and a plurality of second electronic signals in sequence according to the plurality of musical notes, wherein in correspondence to each musical note, one of the first electronic signals and one of the second electronic signals are outputted at a same time;
an assistant interface configured to be disposed on a physical keyboard, and display a key indication image on a key of the physical keyboard according to each first electronic signal; and
a wearable device comprising a plurality of finger sleeves, and configured to generate an indication signal on one of the finger sleeves according to each second electronic signal.

2. The learning assistant system of claim 1, wherein the assistant interface comprises a pressure sensing module configured to generate a sensing signal according to a pressing event on the physical keyboard.

3. The learning assistant system of claim 2, wherein the controller is further configured to issue a rating according to how accurately the sensing signal matches with a corresponding musical note.

4. The learning assistant system of claim 2, wherein the pressure sensing module is a touch sensor or an image sensor.

5. The learning assistant system of claim 4, wherein the controller is further configured to issue a rating according to how accurately the sensing signal matches with a corresponding musical note.

6. The learning assistant system of claim 1, wherein the wearable device further comprises a pressure sensing module configured to generate a sensing signal according to a pressing event on the physical keyboard.

7. The learning assistant system of claim 6, wherein the controller is further configured to issue a rating according to how accurately the sensing signal matches with a corresponding musical note.

8. The learning assistant system of claim 6, wherein the pressure sensing module is a piezoelectric module.

9. The learning assistant system of claim 8, wherein the controller is further configured to issue a rating according to how accurately the sensing signal matches with a corresponding musical note.

10. The learning assistant system of claim 1, wherein the assistant interface comprises a transparent flexible light emitting diode module configured to display the key indication image.

11. The learning assistant system of claim 1, wherein the indication signal generated by the wearable device is a finger indication image, and a color of the finger indication image is the same as a color of the key indication image.

12. The learning assistant system of claim 1, wherein the wearable device is further configured to generate a vibration on one of the finger sleeves according to each second electronic signal.

13. The learning assistant system of claim 1, wherein a size of the key indication image is positive correlated to a duration of a corresponding musical note.

14. The learning assistant system of claim 1, wherein the controller is further configured to analyze a sheet music to generate the musical composition information.

15. The learning assistant system of claim 1, wherein the controller and the wearable device are linked wirelessly.

16. The learning assistant system of claim 1, wherein the musical composition information further comprises piano fingering regarding a sheet music, and beat information of a plurality of bars in the sheet music, the beat information of each bar can form a rhythm with a certain speed, and the rhythm combines information of musical notes to form a melody.

* * * * *